(12) United States Patent
Ungari et al.

(10) Patent No.: US 8,626,249 B2
(45) Date of Patent: Jan. 7, 2014

(54) CHARGING STATION THAT OPERATES AS AN INTERMEDIARY DEVICE BETWEEN MOBILE DEVICES AND OTHER DEVICES

(75) Inventors: Joseph Ungari, Seattle, WA (US); Winston Wang, Bellevue, WA (US); Robert Buck, Bellevue, WA (US); Mike Kemery, Seattle, WA (US); Paulo S. T. Chow, North Bend, WA (US); Anthony Giardini, Bellevue, WA (US); Valerie Goulart, Bellevue, WA (US); Ming Ligh, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 970 days.

(21) Appl. No.: 12/190,528

(22) Filed: Aug. 12, 2008

(65) Prior Publication Data

US 2010/0041333 A1     Feb. 18, 2010

(51) Int. Cl.
     *H04B 1/38*        (2006.01)

(52) U.S. Cl.
     USPC ......... 455/573; 455/41.2; 455/41.1; 455/571; 455/572; 455/127.1; 320/108; 320/114; 320/106; 320/111; 320/115; 235/492; 342/42; 342/51; 363/21.02

(58) Field of Classification Search
     USPC ......... 455/41.1, 41.2, 571, 572, 127.1, 575.5; 320/108, 114, 106, 111, 112, 115; 235/492; 342/42, 51; 363/21.02
     See application file for complete search history.

(56) References Cited

U.S. PATENT DOCUMENTS

| | | | |
|---|---|---|---|
| 5,689,825 A | 11/1997 | Averbuch et al. | |
| 6,184,651 B1 * | 2/2001 | Fernandez et al. | 320/108 |
| 6,201,957 B1 | 3/2001 | Son et al. | |
| 6,825,669 B2 | 11/2004 | Raichle et al. | |
| 6,917,182 B2 * | 7/2005 | Burton et al. | 320/108 |
| 7,065,658 B1 * | 6/2006 | Baraban et al. | 713/300 |
| 7,504,802 B2 * | 3/2009 | Bersenev | 320/108 |
| 7,522,878 B2 * | 4/2009 | Baarman | 455/41.1 |
| 7,576,514 B2 * | 8/2009 | Hui | 320/108 |
| 7,696,718 B2 * | 4/2010 | Suzuki | 320/108 |
| 2002/0119800 A1 * | 8/2002 | Jaggers et al. | 455/550 |
| 2004/0210933 A1 * | 10/2004 | Dresti et al. | 725/40 |
| 2006/0052141 A1 | 3/2006 | Suzuki | |
| 2006/0176015 A1 | 8/2006 | Bersenev | |
| 2007/0036154 A1 | 2/2007 | Lipman | |
| 2007/0114967 A1 * | 5/2007 | Peng | 320/101 |
| 2007/0279002 A1 | 12/2007 | Partovi | |
| 2009/0298553 A1 * | 12/2009 | Ungari et al. | 455/573 |

OTHER PUBLICATIONS

"Bluetooth Headset User Manual: Jabra BT800," 2004, p. 1-41, Jabra Corporation, United States of America.

(Continued)

*Primary Examiner* — April G Gonzales
(74) *Attorney, Agent, or Firm* — Perkins Coie LLP

(57) ABSTRACT

A charging station for mobile devices that acts as an intermediary device to facilitate communication between mobile devices and other proximate devices. The charging station may receive data with a mobile device via a first communication protocol (e.g., Bluetooth) or in a first data format and may transmit the received data to a proximate device via a second communication protocol (e.g., WiFi) or in a second data format. The charging station may then receive responsive data from the proximate device via the second communication protocol (e.g., WiFi) or second data format and transmit the responsive data the mobile device via the first communication protocol (e.g., Bluetooth) or first data format. In some embodiments, the charging station may communicate status data about a mobile device to other proximate devices.

22 Claims, 10 Drawing Sheets

(56) References Cited

OTHER PUBLICATIONS

International Search Report and Written Opinion for PCT/US2009/045531; Applicant: T-Mobile USA, Inc.; Date of Mailing: Jul. 14, 2009, 12 pages.

Miller, Paul, "Sony Ericsson and Fossil team up for Bluetooth watch," Engadget, Sep. 28, 2006, p. 1-16, Weblogs, Inc. http://www.engadget.com/2006/09/28/sony-ericsson-and-fossil-team-up-for-bluetooth-watch/ [Internet accessed: Jul. 22, 2009].

Quilty-Harper, Conrad, "Sony Ericsson's MBW-100 Bluetooth watch reviewed," Engadget, Oct. 28, 2006, p. 1-10, Weblogs, Inc. http://www.engadget.com/2006/10/28/sony-ericssons-mbw-100-bluetooth-watch-reviewed/ [Internet accessed: Jul. 20, 2009].

International Search Report and Written Opinion, International Application No. PCT/US2009/045532, Filed on May 28, 2009, Applicant: T-Mobile USA, Inc., Date of Mailing Sep. 1, 2009, 13 pages.

\* cited by examiner

CHARGING STATION THAT OPERATES AS AN INTERMEDIARY DEVICE BETWEEN MOBILE DEVICES AND OTHER DEVICES

RELATED APPLICATIONS

This application is related to U.S. patent Ser. No. 12/130,627, filed 30 May 2008 and entitled "CHARGING STATION FOR MOBILE DEVICES THAT ALLOWS ACCESS TO DEVICE SERVICES."

BACKGROUND

When mobile devices, such as mobile telecommunications devices (e.g., mobile phones, personal digital assistants (PDAs), portable email devices, Blackberrys, etc.), personal media players, or like devices are being charged, they are typically not used by a user. A user's hesitancy to use a mobile device during charging periods may arise for different reasons. In some situations, the power cord used to connect a mobile device to a power outlet may be too short to allow a user to comfortably use the device. In some situations, the power outlet used to charge the device may be in a location that isn't conducive to use of the device. For example, the power outlet may be located in a high traffic area like a kitchen where a user may not feel comfortable holding a conversation for a long period of time or where the general noise level may make it difficult to use the device. And in some situations, a mobile device may be charged in a location where there are more convenient options for communication or other services offered by the mobile device. For example, rather than use a mobile telecommunications device (e.g. a mobile phone), a user may be more inclined to use a landline phone at his/her residence because of the convenience of the landline phone. As another example, rather than use a PDA to access a weather service and obtain a weather forecast, a user may be more inclined to use a home computer or turn on a television to obtain a weather forecast. By limiting the use of a mobile device during charging periods, users cannot fully take advantage of the services that are provided by the mobile device. As a result, it would be advantageous to improve on the manner and circumstances in which mobile devices can be utilized.

DETAILED DESCRIPTION

Figure 1:
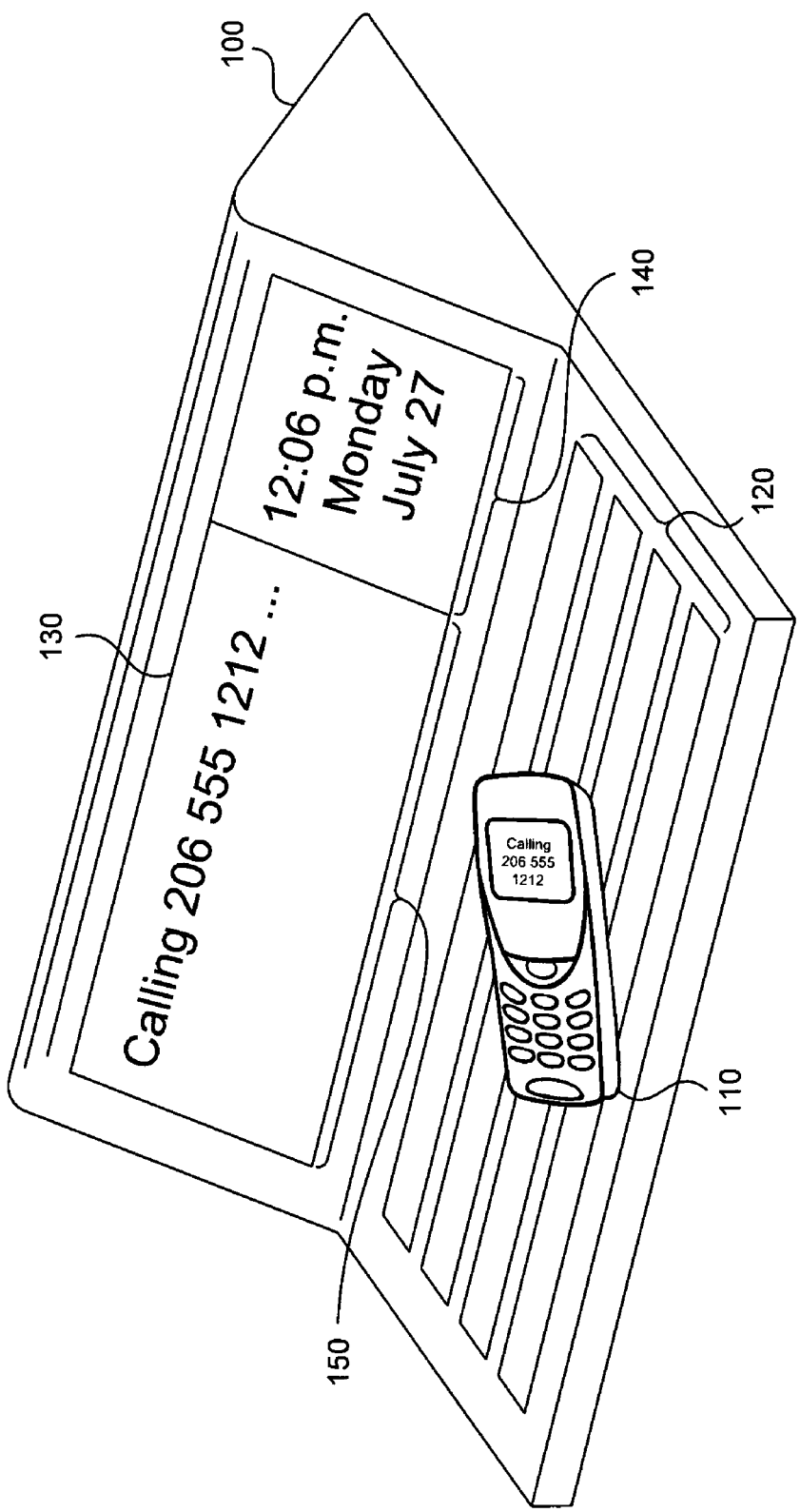
FIG. 1 is a perspective diagram of a charging station with a mobile device positioned on the charging station for charging.

A charging station for mobile devices that acts as an intermediary device to facilitate communication between mobile devices and other proximate devices is disclosed. The charging station may receive data with a mobile device via a first communication protocol (e.g., Bluetooth) or in a first data format and may transmit the received data to a proximate device via a second communication protocol (e.g., WiFi) or in a second data format. The charging station may then receive responsive data from the proximate device via the second communication protocol (e.g., WiFi) or second data format and transmit the responsive data the mobile device via the first communication protocol (e.g., Bluetooth) or first data format. In this fashion, the charging station facilitates interaction between mobile devices and other proximate devices.

In some embodiments, the charging station may communicate status data about a mobile device to proximate devices. The received status information may be used for a variety of purposes. For example, the charging station may notify a nearby computer that a mobile device is being charged. The computer may convey the state of the mobile device to a service provider associated with the mobile device, and the service provider may use the status information to make service decisions associated with the mobile device. For example, if the mobile device is a mobile phone, calls may be rerouted to an alternative number if the mobile phone is being recharged.

In some embodiments, the charging station allows a user to access mobile device services while a mobile device is being charged at the charging station or is located adjacent the charging station. The charging station includes a charging pad where a mobile device is placed to initiate automatic charging without having to connect the mobile device to a charging cord or cable. The charging station also includes a display and communication components for wirelessly linking the charging station with the mobile device. When the mobile device is within proximity of the charging station, the charging station establishes a connection with the mobile device to allow the services offered by the mobile device to be accessed via the charging station. For example, if the mobile device is a mobile phone, a user may make calls from the charging station by accessing the address book of the mobile phone, selecting a number to call, and placing the call from the charging station. The charging station thereby greatly extends the usability of a mobile device in a home, business, or other setting.

In some embodiments, the display on the charging station may be larger than the display of the mobile device or may be configured with different dimensions than the display on the mobile device. As a result, the charging station display may portray multiple services, may portray a greater amount of information for a single service, or may format information in a different fashion for presentation to a user. The display of the charging station thereby enhances the amount and type of data that may be accessed by the user using the services of the mobile device.

In some embodiments, the charging pad of the charging station may be replaced with a dock or traditional cable that allows the mobile device to be connected to a power supply for recharging. While less convenient than the charging pad, a dock or traditional cable require no modifications to mobile devices in order to allow device charging.

In some embodiments, the charging station offers access to services offered by other proximate devices, such as desktop computers, laptop computers, digital picture frames, Internet appliances, and other devices (hereinafter "proximate device" or "proximate devices"). For example, the charging station may include communication components for wirelessly linking the charging station with a computer that is located in close proximity to the charging station. A user may use the charging station to establish a connection with the computer and access the services offered by the computer via the charging station. Although the charging station may offer minimal functionality on its own, the charging station therefore provides an interface to other proximate devices that are able to offer useful services to a user.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a perspective diagram of a charging station 100 that allows a mobile device 110 to be charged while at the same time allowing a user to access communication or other services that are offered by the mobile device or by another device. The mobile device 110 may be a mobile telecommunications device (e.g., a mobile phone, a personal digital assistant (PDA), a portable email device, a Blackberry, etc.), a personal media player such as an iPod or Zune, or any other mobile device having batteries and offering services via a wireless connection. The charging station 100 includes a charging pad 120 upon which a mobile device is placed to engage the charging station's charging features. Various technologies may be used to automatically implement cordless charging. In some embodiments, the charging pad 120 is comprised of a plurality of conductive strips through which current may flow. A mobile device is configured with a plurality of contact points that protrude from the case of the mobile device and which come into contact with two or more of the plurality of conductive strips when the mobile device is placed on the conductive pad. The connection formed between the contact points and the conductive strips allow current to flow from the charging pad to the mobile device, which may be used to charge the batteries of the mobile device. Such contact-point-based charging pad technology is offered by WildCharge, Inc. of Scottsdale, Ariz. and sold under the WildCharge™ brand. In some embodiments, the charging pad 120 operates using magnetic induction. A varying magnetic field is generated by the charging pad. A mobile device placed on the charging pad is brought within the magnetic field, and current is inductively induced in a receiver that is built into the mobile device and used to charge the batteries of the mobile device. Such magnetic-field-based charging pad technology is offered by Splashpower Ltd. of Cambridge, UK, and sold under the Splashpower™ brand. It will be appreciated that other cordless charging technologies may be used to construct the charging pad 120.

While only a single mobile device 110 is depicted in FIG. 1 as being charged on the charging pad 120, two or more mobile devices may be charged at the same time. The number of mobile devices that may be simultaneously charged depends on the size of the charging pad, the size of each mobile device, and the cordless charging method used by the charging pad. Moreover, although the charging station 100 depicted in FIG. 1 has only a single charging pad based on a single charging pad technology, it will be appreciated that the charging station may have two or more charging pads based on the same or different charging pad technologies. The use of multiple technologies to implement the charging pad allows the charging station to accommodate a greater range of mobile devices. It will also be appreciated that the charging pad of the charging station may be replaced with a dock or traditional cable that allows a mobile device to be connected to a power supply for recharging. While less convenient than the charging pad, a dock or traditional cable require no modifications to mobile devices in order to allow device charging.

Figure 2:
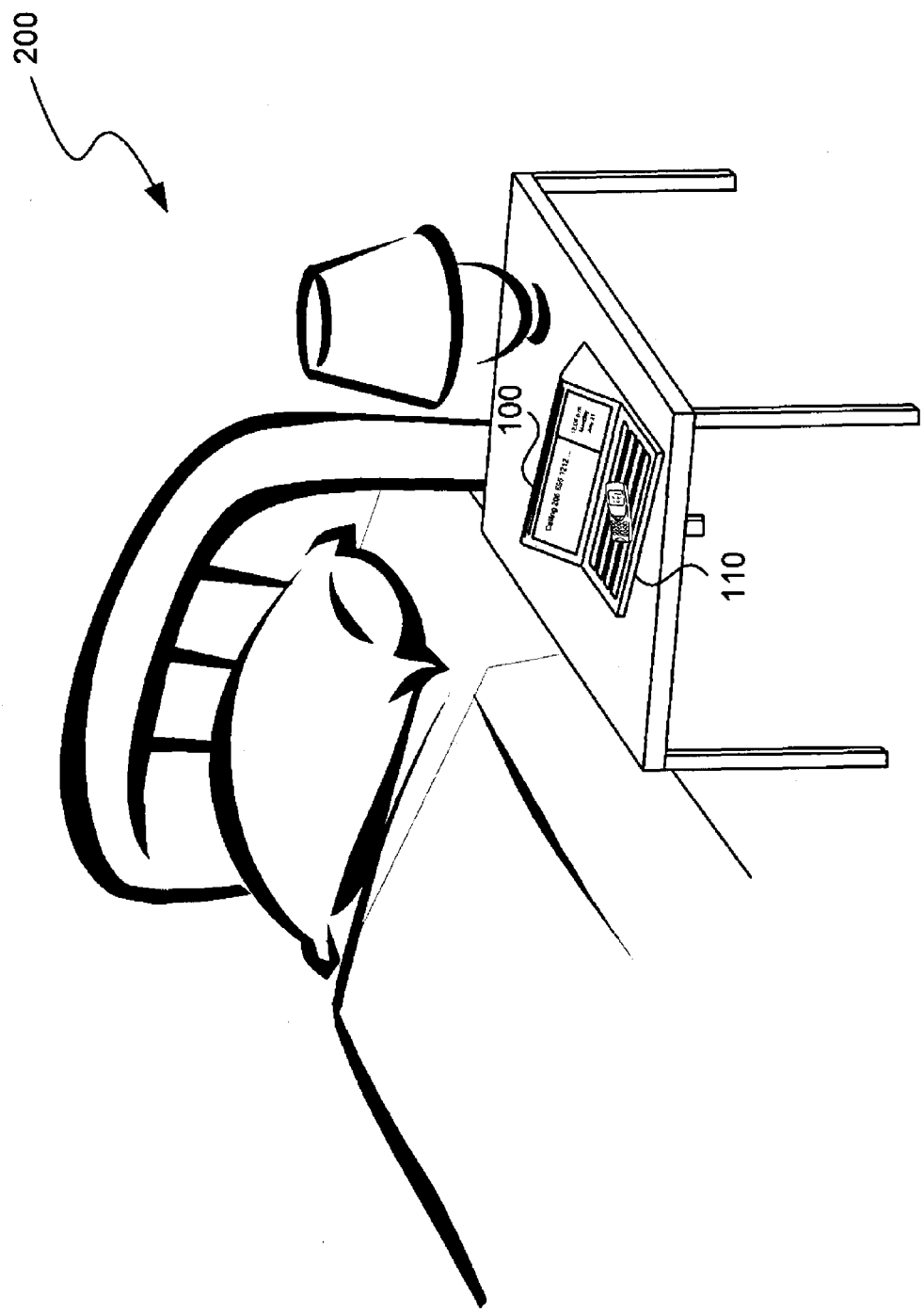
FIG. 2 is a perspective diagram of a charging station for mobile devices used in a consumer setting.

In addition to a charging pad 120, the charging station 100 includes a display 130, which in some embodiments is a touchscreen display. The touchscreen display may be a Liquid Crystal Display (LCD), an Organic Light-Emitting Diode (OLED) display, a Liquid Crystal on Silicon (LCOS) display, etc. As will be described in additional detail herein, the charging station includes communication components that enable services of the mobile device or of other proximate devices to be accessed via the display. For example, if the mobile device being charged is a mobile phone, a user may use the charging pad 120 to make a telephone call by accessing the address book of the mobile phone via the charging pad's display 130, selecting a number to call, and placing the call. As another example, a user may use the display 130 to look up an address contained in an address book of the mobile device. As another example, a user may use the display 130 to select and play music that is stored in a media player mobile device. When a mobile device is not present on the charging station, the display allows a user to access functionality that is resident in the charging station. For example, the charging station may include a clock component and a radio tuner. When a mobile device is absent, the user may view the time or listen to a radio station using the charging station. FIG. 2 depicts, for example, a bedroom environment 200 in which the charging station is used as a clock radio.

The charging station 100 allows a user to select options or enter text by various interfaces that are presented on the display 150. If the display is a touchscreen, the user may select options by touching icons or operating controls that are present on the display. To allow a user to enter text, the charging station may present a keyboard or other text-entry interface on the display. In embodiments where the display is not a touchscreen, a keypad, buttons, knobs, or other controls may be used on the charging station to allow a user to select functions or enter text. For example, one or more keys may be deployed around the periphery of the display 150, and the user may select a key that corresponds to text that is displayed adjacent to that key on the display.

The display 130 on the charging station is typically larger than the display that is contained on the mobile device 110. As a result, the display 130 may be used to display a greater amount of information than would normally be viewable on a single screen of the mobile device. To take advantage of this capability, in some embodiments the display may be partitioned into a number of regions that each has a different purpose. For example, the display 130 shown in FIG. 1 has been partitioned into a first region 140 that is devoted to displaying the time and date, and a second region 150 that is currently being used to depict the status of a phone call being made by a user through the mobile device. As another example, the first region may be devoted to one mobile device service (e.g., an address book) while the second region may be devoted to another service (e.g., a chat application). It will be appreciated that a greater or lesser number of regions may be displayed to a user, and the purpose of each region may be fixed or may be dynamically changed over time.

While the charging pad 120 is depicted as extending in front of the display 130 in FIG. 1, it will be appreciated that the charging pad may instead extend to the side of, behind, above (e.g., on a top surface) or beneath (e.g., in a shelf or opening) the display. Since it is not necessary for a user to be able to see or manipulate the mobile device 110 while the device is on the charging pad, the charging pad may be placed in any location that minimizes any interference with the operation of the display 130 or any associated controls on the charging station. The charging pad may also be placed in a location that maximizes the aesthetic aspects of the charging station.

Figure 3:
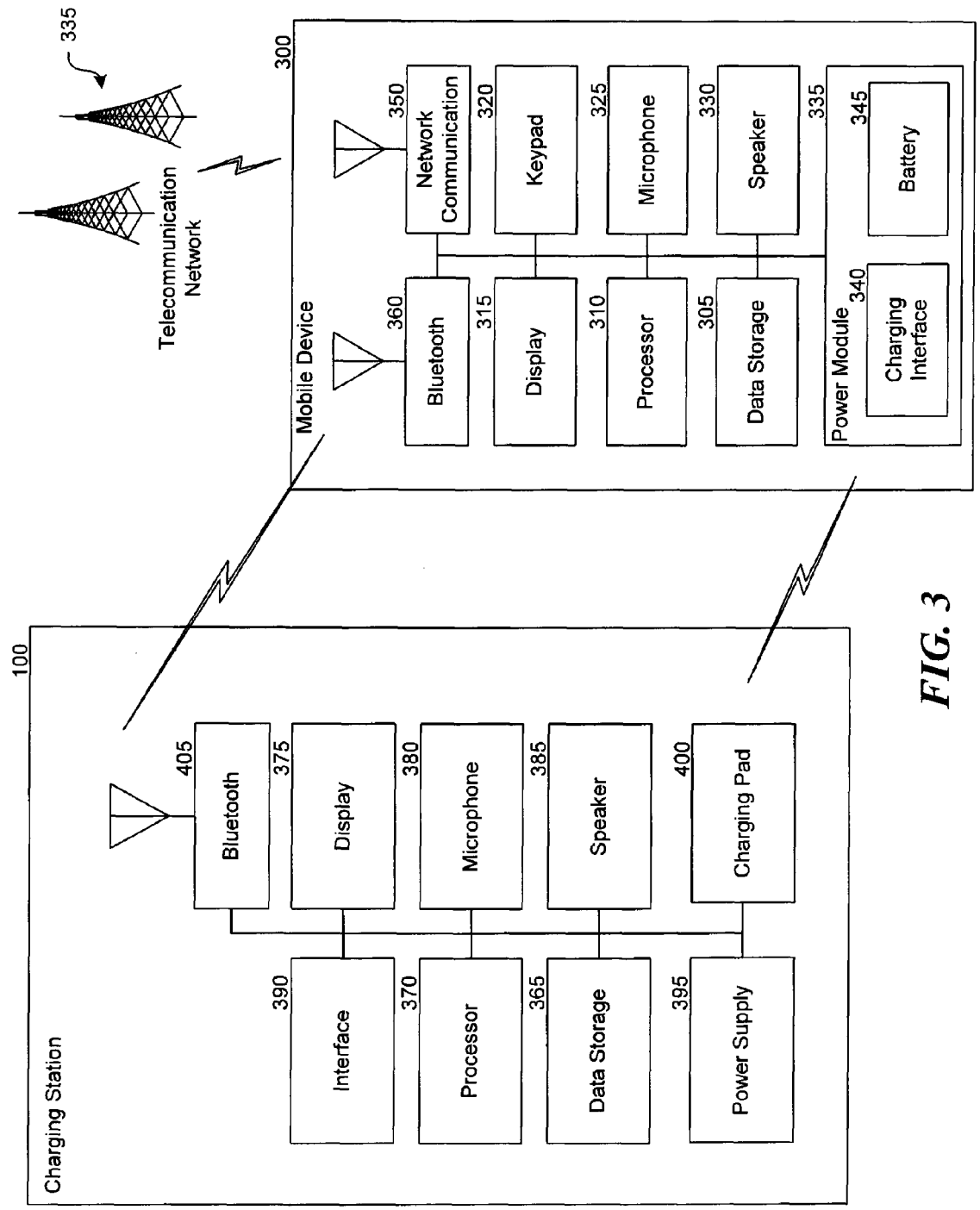
FIG. 3 is a block diagram of components in a charging station and in a mobile device to enable charging of the mobile device and the use of services offered by the mobile device.

FIG. 3 is a block diagram of various components in the charging station 100 and a mobile device, in the depicted example a mobile phone 310, that enable charging of the mobile device and the use of services offered by the mobile device through the charging station. The mobile phone 300 includes a data storage medium component 305 (e.g., hard drive, flash memory, memory card, etc.) that stores content and other data (e.g., processing instructions, configuration settings, etc.), and a processor 310 for executing processing instructions in order to implement the various features disclosed herein, such as communication services, transcoding of data, reporting of status, etc. To allow a user to interact with and use the communication and other services of the mobile phone, the mobile phone may include a display 315, a keypad or touchpad 320, a microphone 325, and a speaker 330. A power module 335 having a charging interface 340 and a battery 345 provide power to the mobile phone. As discussed above, the charging interface 340 may be based on cordless charging technologies such as contact-point or magnetic field charging, or may be based on corded charging technologies.

The mobile phone 300 includes two communications components. The mobile phone includes a Bluetooth component 360 or other communication component that implements a short-range communication protocol (e.g., WiFi, Ultra-wideband, ZigBee, infrared, etc.). The mobile phone 300 also includes a network communication component 350 that enables the mobile phone to communicate by transmitting and receiving wireless signals using licensed, semi-licensed or unlicensed spectrum over a telecommunications network 355. Telecommunications networks include third-party telecommunications networks such as a Global System for Mobile (GSM) mobile telecommunications network, a code/time division multiple access (CDMA/TDMA) mobile telecommunications network, a 3rd Generation (3G) mobile telecommunications network (e.g. General Packet Radio Service (GPRS/EGPRS), Enhanced Data rates for GSM Evolution (EDGE), or Universal Mobile Telecommunications System (UMTS)), or other telecommunications network. Those skilled in the art will appreciate that various other components (not shown) may be included in the mobile phone to enable network communication. For example, if the mobile phone is configured to communicate over a GSM mobile telecommunications network, the mobile phone may include a Subscriber Identity Module (SIM) card that stores an International Mobile Subscriber Identity (IMSI) number that is used to identify the mobile phone on the GSM mobile telecommunications network. If the mobile phone is configured to communicate over another telecommunications network, the mobile phone may include other components that enable it to be identified on the other telecommunications network. In some embodiments, the mobile phone 300 includes components that enable it to connect to a telecommunications network using Generic Access Network (GAN) or Unlicensed Mobile Access (UMA) standards and protocols. For example, the mobile phone may include components that support Internet Protocol (IP)-based communication over a Wireless Local Area Network (WLAN) and components that enable communication with the telecommunications network over the IP-based WLAN.

With the exception of the charging interface 340 that is unique to the type of cordless charging technology that is being used, the components in the mobile phone 300 are therefore those that are typically found in most mobile phones. The mobile phone may contain application programs that allow a user to access various services that are local to the phone. For example, the mobile phone may contain an application that is stored in the phone memory and that allows a user to play a game on the mobile phone even if the mobile phone is not connected to a telecommunication network. The mobile phone may also contain an operating system or applications that allow a user to access various services that are not located on the phone. For example, the mobile phone may allow a user to access an address book or pictures that are stored on a remote server that is accessed through a telecommunication network. Further, the mobile phone may contain data files consisting of images or video that may be displayed on the mobile phone's display.

While the mobile phone 300 depicted in FIG. 3 contains components that enable both short and long range communications, it will be appreciated that other mobile devices 110 may incorporate components that implement only short range communications. For example, a mobile media player device may only offer short range communication capability via protocols such as Bluetooth, WiFi, Ultra-wideband, ZigBee, infrared, etc.

Turning to the charging station 100, the charging station includes a data storage medium component 365 (e.g., hard drive, flash memory, memory card, etc.) that stores content and other data (e.g., processing instructions, configuration settings, etc.), and a processor 370 for executing processing instructions. To allow a user to interact with the charging station and gain access to the communication and other services of the mobile device, the charging station includes the display 130, a microphone 380, and one or more speakers 385. The charging station may include various user interface controls 390 (e.g., keypad, buttons) to allow a user to select functions and enter data. If the display 130 is a touchscreen display, however, the interface controls 390 may be omitted or limited and the display used as the primary mechanism to allow a user to select functions and enter data. The charging station 100 also includes a power supply 395 that is coupled to the charging pad 120. The charging station is typically plugged into an electrical outlet, and the power supply regulates the power and converts the power into a form that is required by the charging pad. As discussed above, the charging pad 120 may utilize one of a variety of cordless charging technologies, such as contact-point or magnetic field charging.

The charging station 100 includes at least one communications component. For instance, the charging station 100 may include a Bluetooth component 405 to allow the charging station to communicate with a mobile device. In lieu of or in addition to the Bluetooth component, the charging station may include any other communication components that operate using a short-range communication protocols (e.g., Wi-Fi, Ultra-wideband, ZigBee, infrared, etc.) that are necessary to communicate with a mobile device or with other proximate devices. In some embodiments, the charging station may include multiple short-range communication components in order to enable the charging station to communication with a broad range of mobile devices and other proximate devices.

In some embodiments, the charging station 100 may include one or more communication components (not shown) that operate using long-range communication protocols (e.g., GSM, GPRS, UMTS, CDMA, etc.) to allow the charging station to communicate via one or more telecommunications networks. Various other components may be included in the charging station to enable such network communication. For example, if the charging station is configured to communicate over a GSM mobile telecommunications network, the charging station may include a Subscriber Identity Module (SIM) card that stores an International Mobile Subscriber Identity (IMSI) number that is used to identify the charging station on the GSM mobile telecommunications network. If the charging station is configured to communicate over another telecommunications network, the charging station may include other components that enable it to be identified on the other telecommunications network. If the charging station includes such long-range communication components, it will be appreciated that the charging station may directly operate as a phone in addition to accessing comparable services via the mobile device.

The components depicted in FIG. 3 create two interfaces between the charging station 100 and the mobile phone 300. The first interface is a charging interface 375 that is established between the charging pad 120 of the charging station and the charging interface 340 of the mobile phone. The charging interface 375 allows the mobile phone to engage the charging station 100 charging features, permitting the battery 345 of the mobile phone to be charged from power provided by charging station. The charging is performed cordlessly and automatically when the mobile phone is brought into close proximity or into contact with the charging pad. The second interface is a communications interface 399 that is established between, for instance, the Bluetooth module 405 of the charging station and the Bluetooth module 360 of the mobile phone. The communications interface allows the charging station to wirelessly exchange data and commands with the mobile phone. The communications interface thereby allows a user of the charging station to access communications and other services that are offered by the mobile phone.

In some embodiments, the components in the charging station 100 also create an interface between the charging station and other proximate devices (not shown). Other proximate devices may include, but are not limited to, other charging stations, handsets, computers, computing devices, and devices that store and play media. A proximate device may also be an electronic messaging device such as described in PCT application serial no. PCT/US08/61585, filed on 25 Apr. 2008 and entitled "MESSAGING DEVICE HAVING A GRAPHICAL USER INTERFACE FOR INITIATING COMMUNICATION TO RECIPIENTS," which is hereby incorporated by this reference in its entirety. A communications interface may be established between the charging station and one or more proximate devices via Wi-Fi or other short-range or long-range communication protocols. The communications interface allows the charging station to wirelessly exchange data with a proximate device. The communications interface thereby allows a user of the charging station to access communications and other services that are offered by the proximate device. The communications interface also allows the charging station to act as an intermediary device between a mobile device and a proximate device. That is, data received from a proximate device via a first communications protocol or in a first data format is converted to a second communications protocol or a second data format for transmission to a mobile device. And data received from the mobile device via a second communications protocol or second data format is converted to a first communications protocol or first data format for communication to the first proximate device. The use of the charging station as an intermediary device will be described in additional detail herein.

Figure 4:
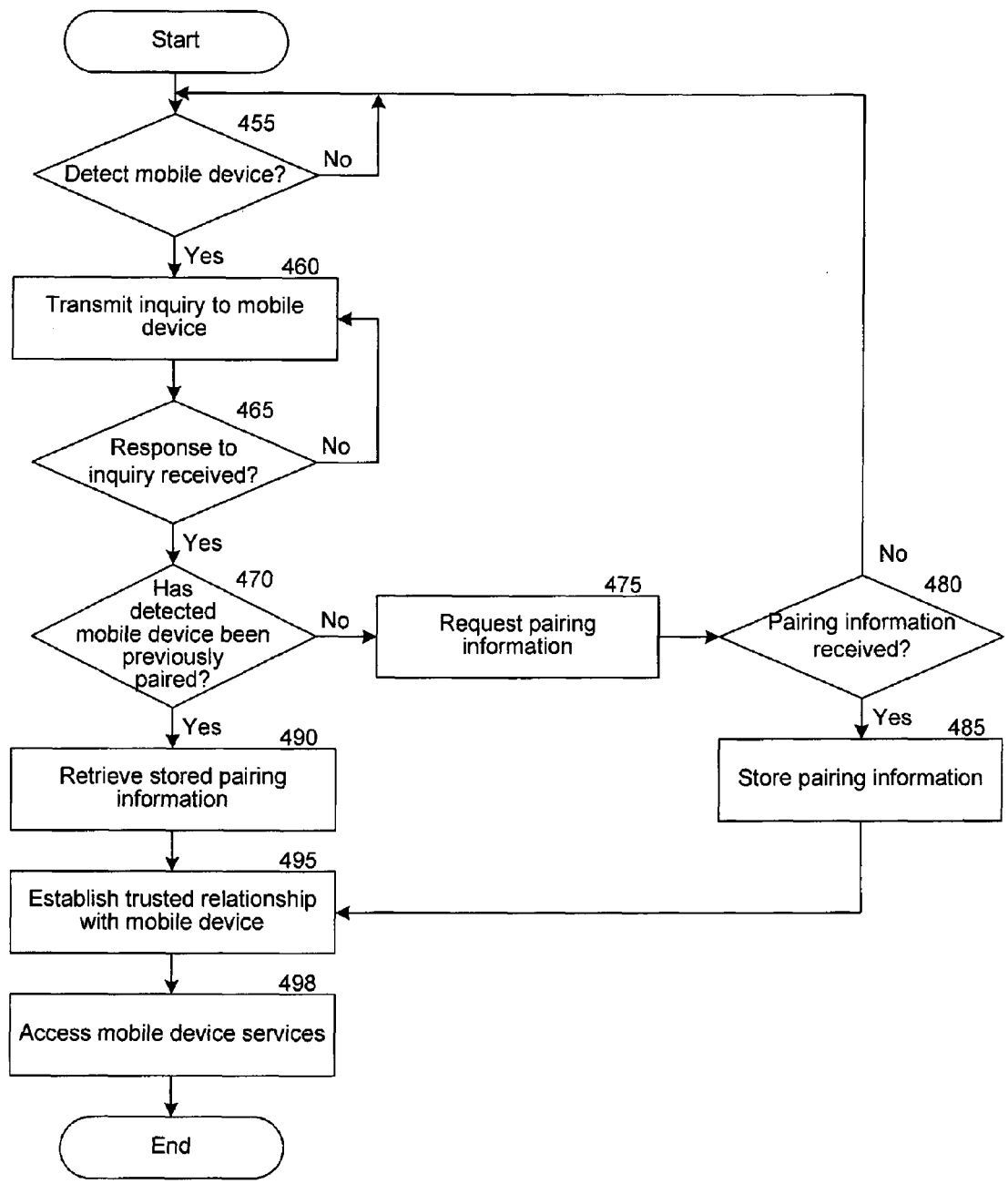
FIG. 4 is a flow chart of a process for detecting a mobile device and services offered by the mobile device.

FIG. 4 is a flow chart of a process 450 implemented by the charging station 100 to detect a mobile device 110 (such as a mobile phone 300), to ascertain services offered by the mobile device, and to pair with the mobile device in order to utilize the services offered by the mobile device. At a decision block 455, the charging station 100 waits to detect that a mobile device has been placed on (i.e., has been engaged with) the charging pad 120 for charging. In some embodiments, the charging station is able to detect such engagement as a result of periodic beacon signals transmitted by the charging station and/or mobile device. In some embodiments, the charging station is able to detect such engagement as a result of detection of additional weight placed on the charging pad 120. In some embodiments, the charging station is able to detect such engagement by monitoring the delivery of power via the charging pad (e.g., when charging is detected, it is presumed that a mobile device is present). At a block 460, the charging station transmits an inquiry to the mobile device in which it requests the device name, device class, list of services and other technical information about the device. At a decision block 465, the charging station waits to receive a response from the mobile device. If a response is not received within a certain time period, the charging pad will transmit another inquiry to the mobile device at block 460. If a response is received from the mobile device within a certain time period, processing continues to decision block 470.

At decision block 470, the charging station determines whether it has previously paired with the mobile device. The determination may be made by comparing the identification information received in the response from the mobile device with a table of previously-paired devices that is stored in the data storage area 365. If the mobile device has not been previously paired with the charging station, processing continues to block 475 where the charging station requests pairing information from the user. The pairing information enables the charging station and the mobile device to establish a trusted relationship. At a decision block 480, the charging station waits to receive pairing information from the mobile device. If pairing information is received from the mobile device (i.e., if pairing information is confirmed by a user), at a block 485 the pairing information is stored in the data storage area 365 for future reference. Processing then continues at block 495. If at decision block 470 it is determined that the mobile device has been previously paired with the charging station, processing continues to block 490 where the charging station retrieves stored information from the data storage area 365 that allows the charging station to pair with the mobile device. At block 495, the charging station establishes a trusted relationship with the mobile device. The trusted relationship may or may not involve the encryption of data that is exchanged between the charging station and the mobile device.

At a block 498, the charging station is allowed to access communication and other services offered by the mobile device. The number and type of services that the charging station is allowed to access will depend on the type of mobile device and the specific user or manufacturer settings of the mobile device. Services that may be accessed include communication services (e.g., voice, text), calendars, address books, notes, reminders, media (e.g., pictures, music, video)

or any other services that may be implemented on a mobile device or that are accessible through a mobile device.

Figure 5:
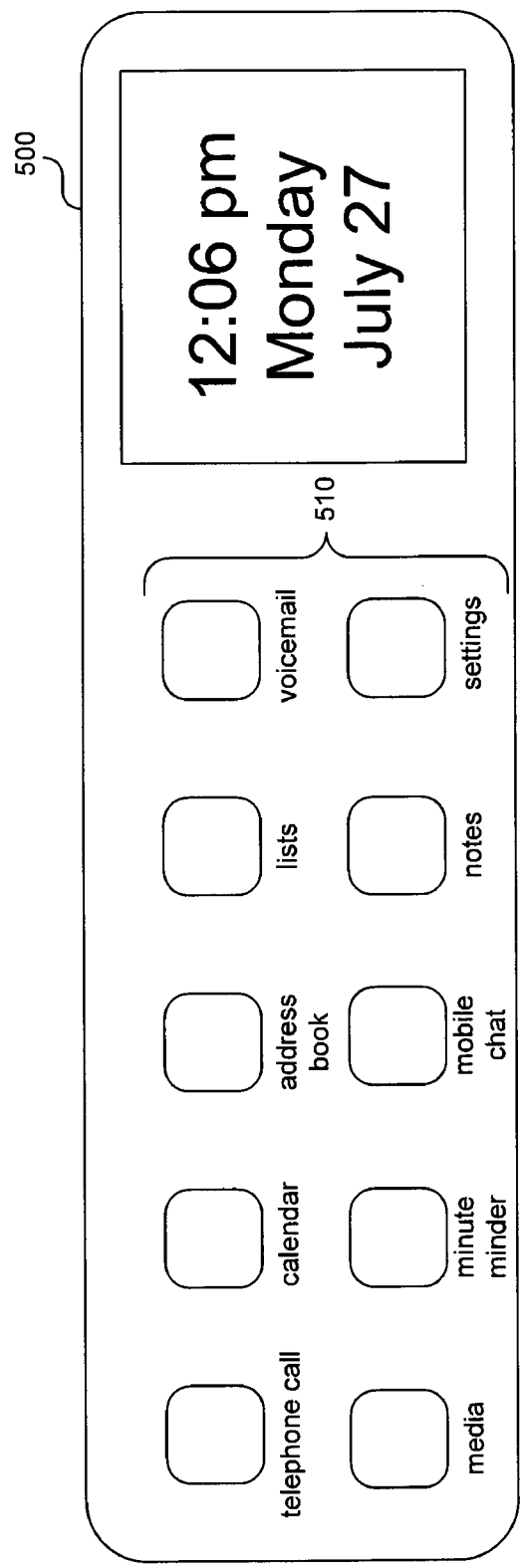
FIG. 5 is a representative user interface on the charging station to allow a user to access services offered by the mobile device.

FIG. 5 is a representative user interface 500 that may be presented on the charging station display 130 to allow a user to access services offered by the mobile device. The user interface may be a duplicate of the user interface that is presented on the mobile device, although scaled or truncated to fit the display of the mobile device. Alternatively, the user interface may be a reformatted or enhanced user interface that is mapped to the user interface of the mobile device. The interface depicts a number of icons 510, each icon being associated with a service available on the mobile device. A user may select a service by pressing the appropriate icon on the touchscreen of the charging station. For example, the user may access the voicemail of the mobile device by selecting the "voicemail" icon. As another example, the user may access pictures and videos stored on the mobile device by selecting the "media" icon. While nine icons are displayed in the representative interface 500, it will be appreciated that a greater or lesser number of icons may be displayed by the charging station. When the charging station detects that an icon has been selected, the charging station issues an appropriate command to the mobile device via the communications interface 399. The mobile device transmits responsive service data to the charging station if the data is stored locally on the mobile device, or accesses a remote service via the telecommunications network 355 if the service involves remote data or communication with another party. By exchanging data with the charging station over the communications interface 399, the mobile device enables the user to remotely access services that are typically accessed using the mobile device.

In some embodiments, the software necessary to offer a service to a user may entirely reside on the mobile device 110 and only user interface data is transmitted to the charging station. In some embodiments, the charging station may include software that executes on the charging station and that aids in offering a service to the user. For example, the charging station may execute a user interface application that reformats, enhances, or supplements data received from the mobile device for display on the charging station display. As another example, the charging station may execute a data compression algorithm to speed the transmission of data over the wireless communications link. Those skilled in the art will appreciate that software functionality may be advantageously divided between the station and the device to improve performance. In some embodiments, the majority of the services that a user accesses at a charging station are services that are offered via a mobile device. In some embodiments, the charging station may offer a significant number of local services to a user and a limited number of services may be accessed via a mobile device.

In some embodiments, the software on the charging station may allow a user to access a number of services offered by the mobile device and integrate the data received from the accessed services for simultaneous display on the charging station display 130. For example, the charging station may display a menu to allow a user to make a phone call at the same time as a calendar is being displayed. On the mobile device, the phone call and the calendar are normally accessed via different menu screens, but because of the larger display size on the charging station the menu and calendar may be brought together and displayed on the same screen.

In some embodiments, a mobile device user is allowed to limit the services that may be accessed from a charging station. For example, the mobile device user may desire to limit the ability to make long distance telephone calls using a charging station. The mobile device may therefore provide a settings management menu to allow a user to enable or disable services that are to be offered through the charging station.

Figure 6A:
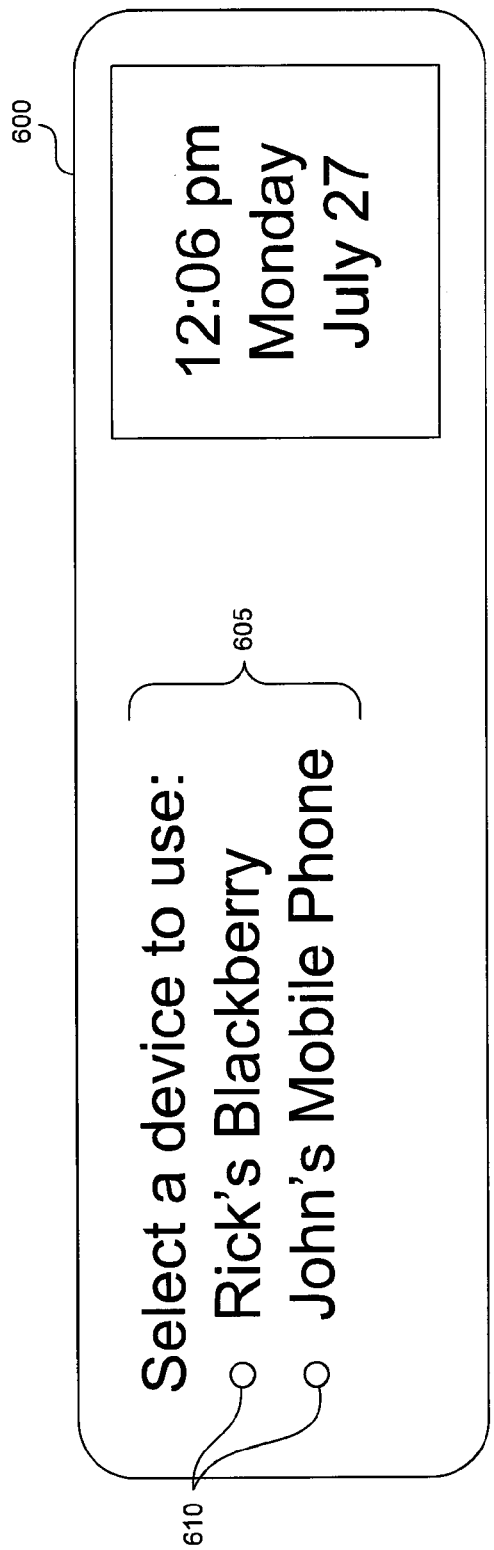
FIGS. 6A-6D are representative screenshots of a user interface which depict a user accessing an address book and communication service through the mobile device.

FIGS. 6A-6D are screenshots of a representative interface that is presented on the charging station display 130. The screenshots depict a series of screens that a user might use to access a communication service through a mobile device. FIG. 6A depicts a first screen 600 that allows a user to select a device. If more than one mobile device has engaged the charging system of the charging station, a user may initially need to select which device the user would like access. In the depicted example, two mobile devices are identified in a message 605 that is displayed to a user. The devices may be identified by device type (e.g., Samsung Beat, Nokia 6103, Motorola RAZR), by nickname (e.g., "Rick's phone"), by user name associated with the phone (e.g., "John Smith"), by photo, by icon, or by any other identifier. The user may select which device to access by selecting a radio button 610 associated with the device. In some embodiments, the user may be required to enter a password or otherwise verify that they are authorized to use the device before proceeding.

Figure 6B:
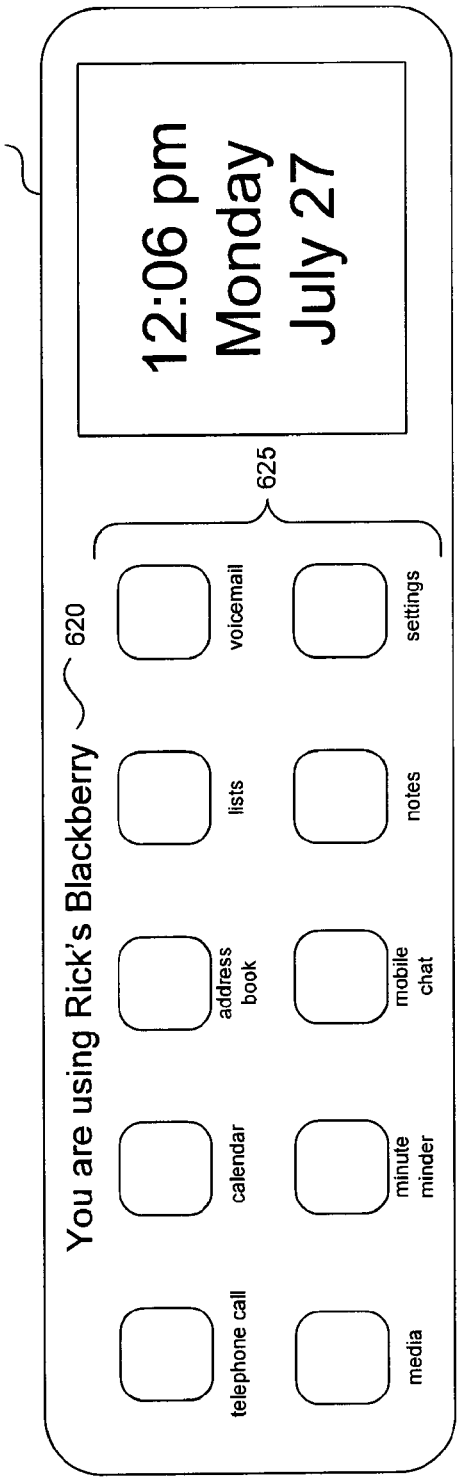

Once a device is selected, the user is presented with a menu of services that may be accessed through the selected device. FIG. 6B depicts a second screen 615 that allows the user to select a service. The second screen identifies which device is being utilized in a banner 620 that appears at the top of the screen. The second screen also depicts a number of icons 625, each icon being associated with a service available on the mobile device. A user may select a service by pressing the appropriate icon on the touchscreen of the charging station. It will be appreciated that the number of services that are displayed will depend on the particular device that is being accessed by the user and other factors.

Figure 6C:
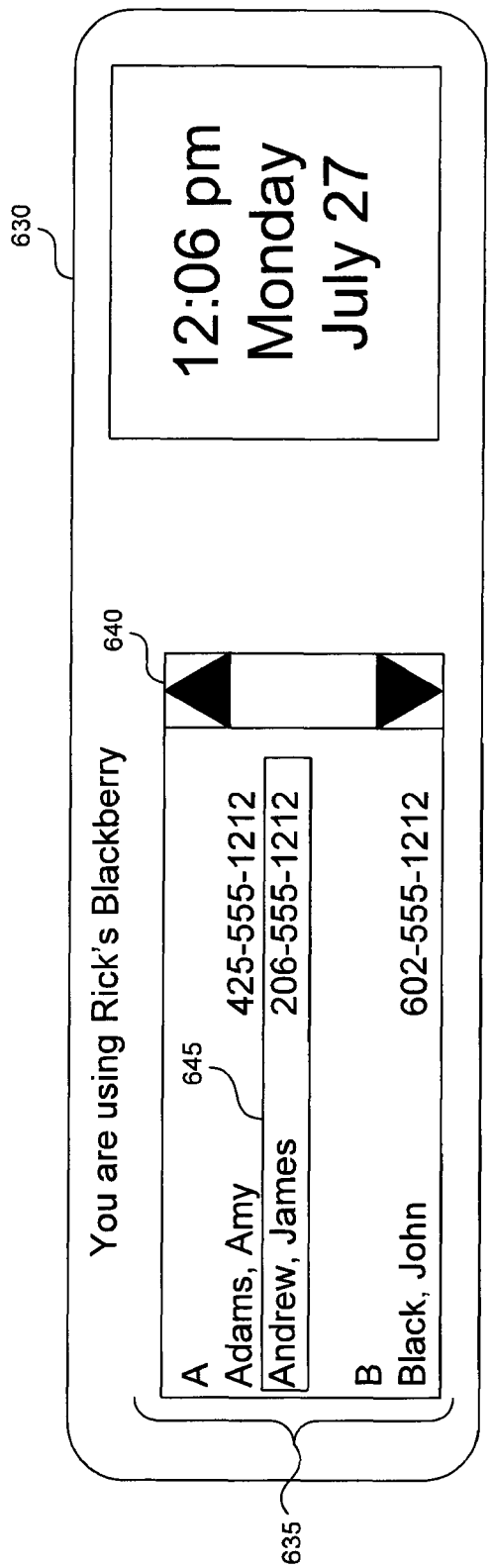

If the user selects one of the services accessible though the mobile device, the user may be presented with a menu associated with the selected service or with data associated with selected service. FIG. 6C depicts a third screen 630 that presents additional details of the selected service. To arrive at the third screen depicted in FIG. 6C, the user selected the "address book" icon from the set of displayed icons 625 in the second screen 615. The user's address book 635 is therefore displayed to the user, sorted alphabetically by last name. The user may scroll within the address book using a scroll bar 640. When a user finds the name of a party that he/she would like to call, the user may select that name by tapping or otherwise selecting the name. In FIG. 6C, the name "James Andrew" has been selected by the user as indicated by the highlighting 645 that is applied to the name after selection.

Figure 6D:
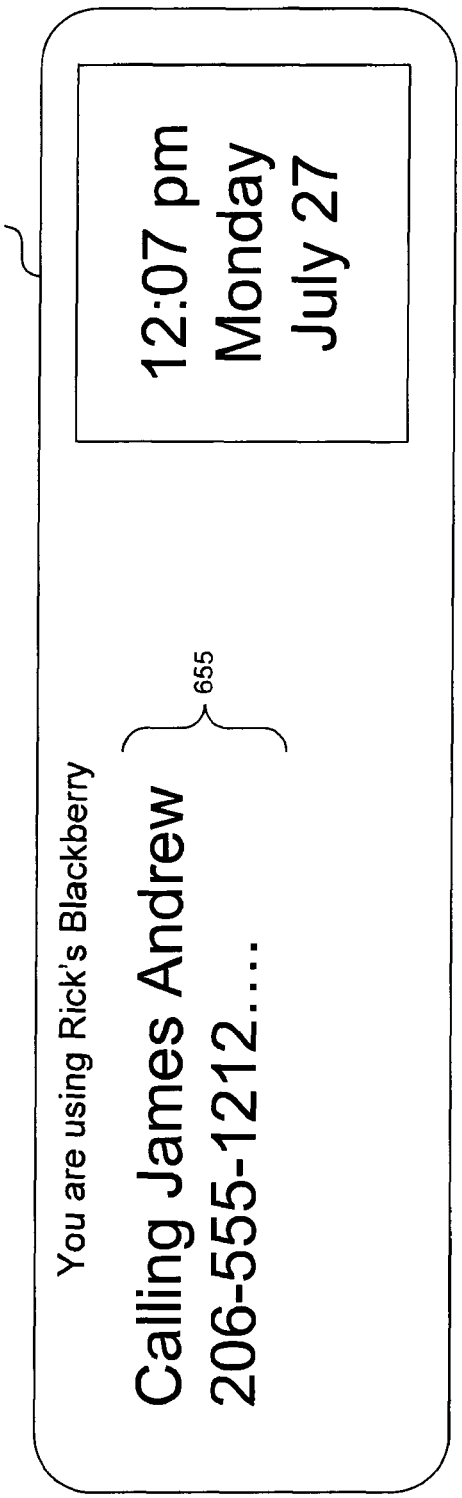

Once the user has selected a name from the third screen 630, the mobile device may be configured to automatically dial the user. FIG. 6D depicts a fourth screen 650 that indicates that a call is being made to "James Andrew." Progress of the call may be displayed to the user in a message 655. Although the selection of the party to call is made on the charging station, the connection to a wireless telecommunications network to complete the call is made by the wireless device. When the call has been initiated, the user may communicate with the other party by speaking into the microphone 380 of the charging station 100 and listening to the other party via the speaker 385 of the charging station. All voice signals are transmitted from the charging station to the mobile device via the Bluetooth connection, before being communicated from the mobile device to the other party via the telecommunication network 355. The charging station thereby increases the opportunity to use mobile device services at times when services would typically go unused, such as during charging periods.

Figure 7:
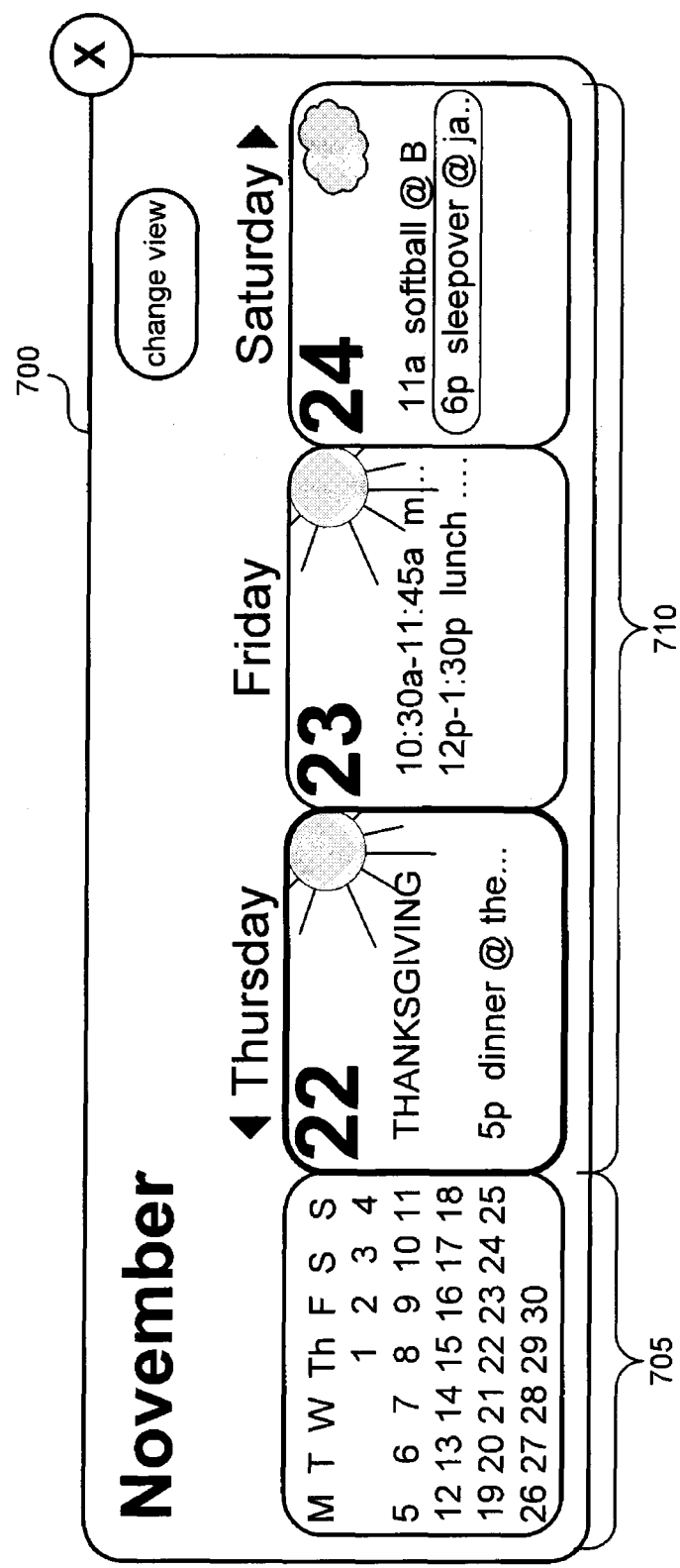
FIG. 7 is a representative user interface which depicts a user accessing a calendar service through the mobile device.

Other mobile device services may, of course, be accessed through the charging station. If, for example, the user selected the icon corresponding to the "calendar" in the set of icons 510, the user would be taken to a calendar that is maintained on the mobile device or in a service utilized by the mobile device. FIG. 7 is a screenshot of an interface 700 to a calendar service. A first region 705 in the interface depicts the month at a glance, so that a user can see and easily select a particular day of the month. A second region 710 of the interface depicts a detailed schedule for three days of the month, with the various activities associated with each day displayed on the schedule. It will be appreciated that the display 120 of the charging station may be significantly larger than the display of the mobile device. As a result, a greater amount of information may be contained in charging station user interfaces when compared to mobile device user interfaces. For example, a mobile device may not be able to depict the first and second regions shown in FIG. 7 in the side-by-side manner that is shown.

Figure 8:
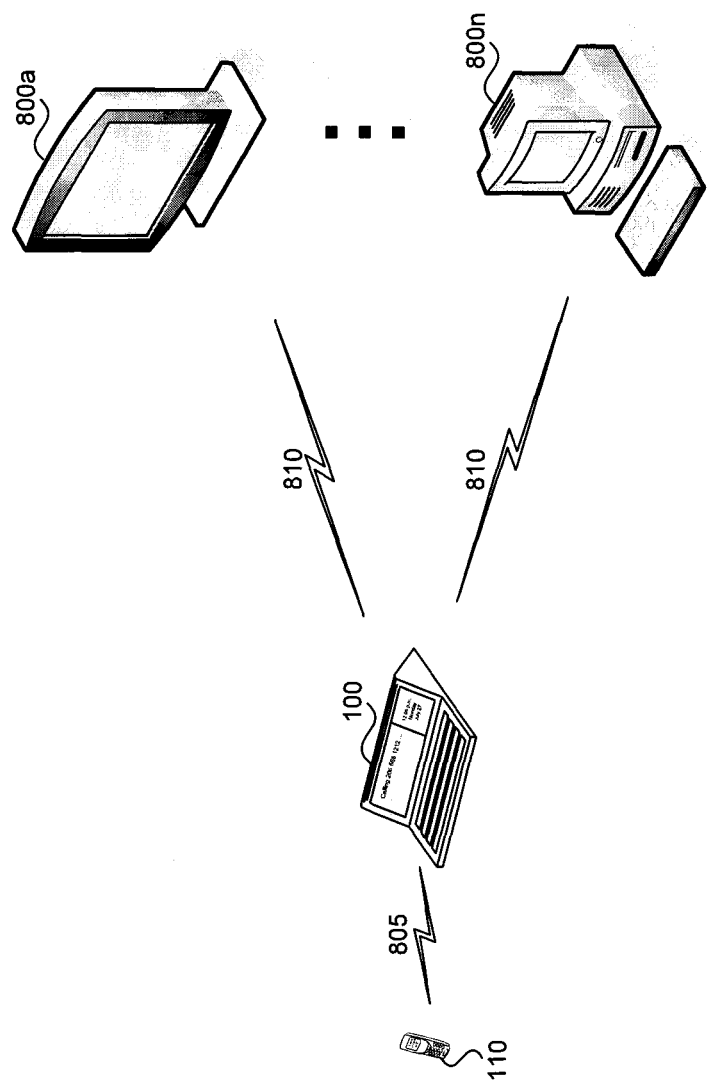
FIG. 8 is a perspective diagram of a charging station acting as an intermediary device to convey communications between a mobile device and other devices.

FIG. 8 is a perspective diagram of charging station 100 acting as an intermediary device to convey information between mobile device 110 and one or more proximate devices 800a, 800b, . . . 800n. As previously noted, the charging station 100 may establish a first communication channel 805 with a mobile device 110 via a short range communication protocol, such as Bluetooth, WiFi, Ultra-wideband, ZigBee, infrared, etc. The charging station 100 may also establish a second communication channel 810 with one or more proximate devices 800a, 800b, . . . 800n via a short range communication protocol, such as Bluetooth, WiFi, Ultra-wideband, ZigBee, infrared, etc. Data received from the mobile device under one communication protocol may be converted by the charging station and transmitted to a proximate device under a second communication protocol, and data received from the proximate device under the second communication protocol may be converted by the charging station and transmitted to the mobile device under the first communication protocol. In addition, data received from a mobile device in a first data format may be converted by the charging station and transmitted to a proximate device in a second data format, and data received from a proximate device in the second data format may be converted by the charging station and transmitted to the mobile device in the second data format. The transcoding of data may be required due to the diversity of mobile devices and the limitations of certain mobile devices. For example, high resolution images received by the charging station may be transcoded to lower resolution images with less color in order to better fit a mobile device's screen size and color limitations. As another example, video data sent to a mobile device may be compressed by the charging station prior to transmission to the mobile device. Techniques for transcoding from one data format to another are well known in the art and will not be discussed in additional detail herein. For any communication, the charging station may convert between communication protocols, may transcode between data formats, or may convert between communication protocols and also transcode between data formats.

By acting as an intermediary device to facilitate data transfer, the charging station provides several benefits. For example, the charging station allows a mobile device to exchange data with a proximate device even though the proximate device may lack the components necessary to communicate with the mobile device directly. As another example, the charging station may extend the effective communication range of the mobile device. If, for instance, a mobile device only contains low-power Bluetooth components (having an effective communication distance of 10 meters), the charging station may extend the effective communication distance if communication with the proximate device is conducted using the WiFi protocol (having an effective communication distance of up to 32 meters indoors). As still another example, the charging station may receive data that is to be delivered to a mobile device, and store the data until the mobile device is brought into proximity with the charging station. The store and forward capability of the charging station may allow data to be delivered in a more cost-effective manner to the mobile device. For example, if the mobile device is a mobile phone, it may be less costly to deliver data to the mobile phone via a short-range communication connection from the charging station, as compared with fees associated with delivering data via the cellular network to the mobile phone.

Once a communication channel is established between the mobile device and a proximate device, various applications may be enabled. For example, the mobile device may back-up or synch data contained on the mobile device to the proximate device. As another example, services that are on or available through the mobile device may be accessed by the proximate device. As another example, the mobile device may receive software or firmware updates via the proximate device. Those skilled in the art will appreciate that the potential applications enabled by a communication channel using the charging station are unlimited.

Figure 9:
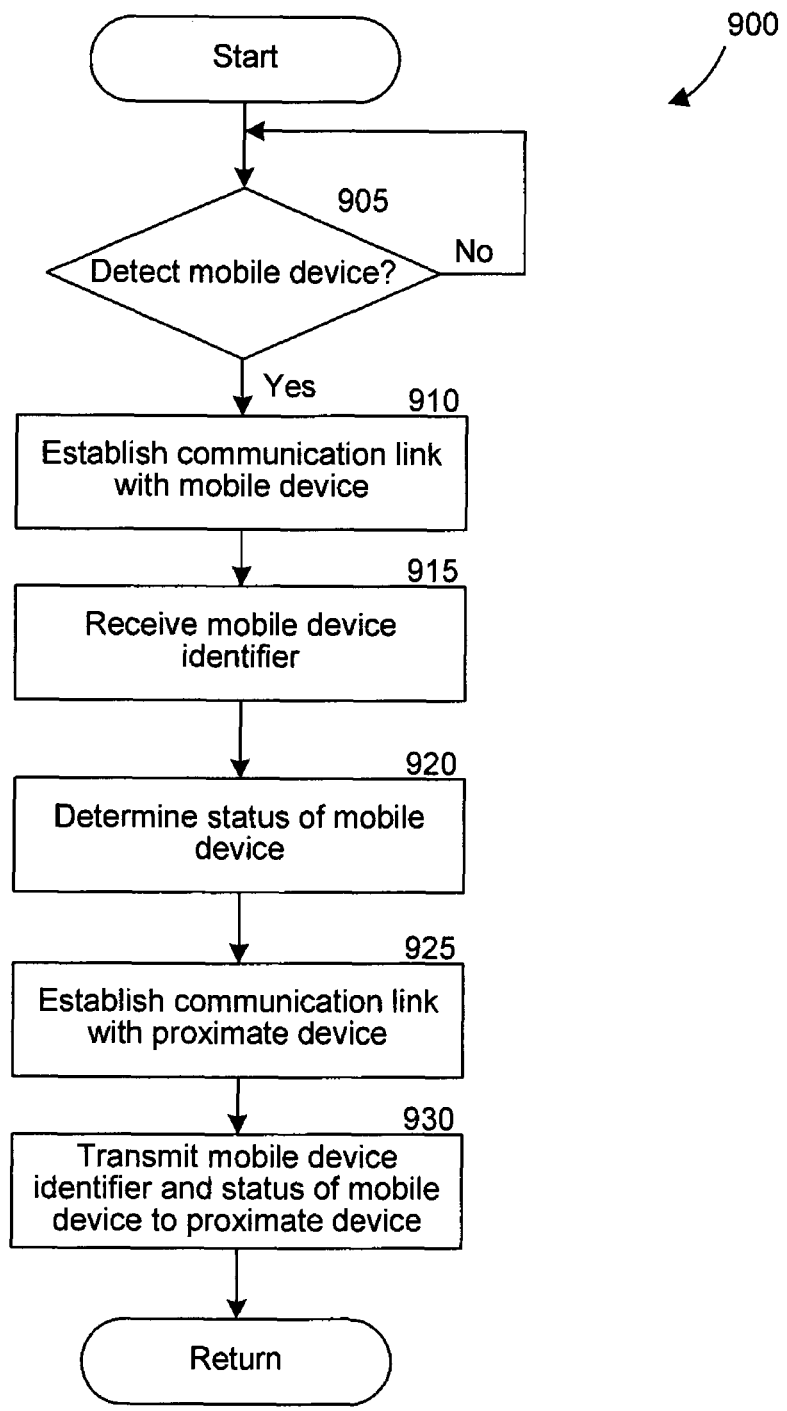
FIG. 9 is a flow chart of a process for notifying a proximate device of the current state of a mobile device.

One application that is enabled by the charging station establishing a communication channel with both a mobile device and a proximate device is that status information about the mobile device may be transmitted to the proximate device and used by the proximate device or others to make service decisions. FIG. 9 is a flow chart of a process 900 for notifying a proximate device of the current status of a mobile device. At a decision block 905, the charging station 100 waits to detect that a mobile device 110 has been placed on (i.e., has been engaged with) the charging pad 120 for charging. As previously described, the presence of a mobile device may be determined by detecting periodic beacon signals transmitted by the charging station and/or mobile device, by detecting additional weight placed on the charging pad, by detecting the delivery of power via the charging pad (i.e., when charging is detected, it is presumed that a mobile device is present), or other method.

When a mobile device is detected at decision block 905, processing continues to block 910 where the charging station establishes a communication link with the mobile device. Once a communication link is established, including any authentication or handshaking between the devices, at a block 915 the charging station receives a mobile device identifier. The mobile device identifier uniquely or semi-uniquely identifies the mobile device or the subscriber of a mobile device. The identifier may be associated with the device (e.g., an IMEI number), or may be assigned by a service provider to a user of the device (e.g., an IMSI number). At a block 920, the status of the mobile device is determined. Certain statuses of the mobile device may be detected by the charging station. For example, the charging station may detect when the mobile device is being charged or is present on the charging pad of the charging station. The charging station may also detect when a user is using the interface of the charging station to access services of the mobile device. Other statuses of the mobile device may be reported to the charging station in response to an inquiry from the charging station. For example, the mobile device may transmit to the charging station an indication of the version of software that is running on the device, may indicate the operational condition of components of the mobile device, or may otherwise provide details pertaining to the health or use of the mobile device. If the mobile device contains any motion or proximity sensors, the readings from those sensors may also be transmitted to the charging station.

At a block 925, the charging station establishes a communication link with a proximate device. At a block 930, the charging station transmits the mobile device identifier and the status of the mobile device to the proximate device. The status of the device may be used by the proximate device to make service and other decisions about the mobile device. The proximate device may also re-transmit the status of the device to other devices or services that can use the status of the mobile device to make service or other decisions about the mobile device. For example, if the mobile device is a mobile phone and the mobile phone is being recharged at a charging station located at the home of a user, the proximate device may retransmit the status of the mobile phone to a telecommunications service provider that provides service to the mobile phone. Upon receiving information indicating that the mobile phone is being recharged, the telecommunications service provider may choose to re-route calls that are directed to the mobile phone instead to the home phone of the user. As another example, the proximate device may be an electronic messaging device that was previously referenced. The electronic messaging device allows users to send a message to a recipient by selecting a device to which the message is to be delivered. If the electronic messaging device is aware that a recipient's mobile device is currently being recharged and therefore may not be in the possession of the recipient, the electronic messaging device may recommend to the sender that the message should be communicated to the recipient in a manner other than via the mobile device. Before even receiving a message for a recipient, the electronic messaging device may also provide a visual indication to the sender that the recipient is not in possession of a mobile device and therefore may not be reachable via a message format that would normally be delivered to the mobile device. The electronic messaging device may also interpret the presence of the mobile device as an indication that the user of the mobile device is also in close proximity to the electronic messaging device. The charging station may learn of various other statuses of a mobile device, such as whether the device is on or off, whether the device is playing media or capturing content (e.g., taking a picture), whether the device memory is empty or full, whether the device is face up, face down, stationary or in motion, or other statuses, all of which may be used to make service decisions. Other uses of the status of the mobile device will be apparent to one skilled in the art.

From the foregoing, it will be appreciated that specific embodiments of the invention have been described herein for purposes of illustration, but that various modifications may be made without deviating from the spirit and scope of the invention. Although wireless technologies were discussed for use in implementing the charging pad 120, it will be appreciated that various wired solutions may be used in lieu of the charging pad. For example, a dock, a cable, or other coupling component may be used to provide power from the charging station 100 to the mobile device 110 for purposes of recharging the batteries of the mobile device. It will also be appreciated that although processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Accordingly, the invention is not limited except as by the appended claims.

We claim:

1. A charging station for detecting and reporting the status of a mobile device that is utilizing the charging station, the charging station comprising:
   a power supply;
   a charging component coupled to the power supply, the charging component configured to charge a mobile device in proximity to the charging station;
   a first communication component for establishing a wireless communication link with the mobile device and receiving an identifier associated with the mobile device;
   a detection component to detect the status of the mobile device in proximity to the charging station; and
   a second communication component for establishing a wireless communication link with a proximate device that is different from the mobile device, wherein the second communication component transmits to the proximate device the received identifier associated with the mobile device and an indication of the detected status of the mobile device to enable the proximate device to make a communication service routing decision with respect to a call or electronic message to the mobile device.

2. The charging station of claim 1, wherein the detected status indicates that the mobile device is being charged.

3. The charging station of claim 1, wherein the detected status indicates that the mobile device is being used for communication.

4. The charging station of claim 1, wherein the detection component detects the status of the mobile device by transmitting a status query to the mobile device via the wireless communication link, and receiving a responsive message from the mobile device that reflects the status of the mobile device.

5. The charging station of claim 1, wherein the wireless communication link established by the first component is via a first protocol and the wireless communication link established by the second component is via a second protocol.

6. The charging station of claim 5, wherein the first protocol is the same as the second protocol.

7. The charging station of claim 1, wherein the first communication component communicates via a protocol selected from a set comprising Bluetooth, WiFi, Zigbee, ultra-wideband and infrared.

8. The charging station of claim 1, wherein the second communication component communicates via a protocol selected from a set comprising Bluetooth, WiFi, Zigbee, ultra-wideband and infrared.

9. The charging station of claim 1, wherein the mobile device is a mobile phone.

10. The charging station of claim 1, wherein the mobile device is a media player.

11. The charging station of claim 1, wherein the received identifier is an International Mobile Equipment Identity number.

12. The charging station of claim 1, wherein the received identifier is an International Mobile Subscriber Identity number.

13. At a charging station, a method of notifying a proximate device of the status of a mobile device that is placed at the charging station, the method comprising:
   detecting the presence of a mobile device when the mobile device is placed at the charging station;

in response to detecting the presence of the mobile device, establishing a first communication channel with the mobile device;

receiving an identifier associated with the mobile device over the first communication channel;

determining the status of the mobile device;

establishing a second communication channel with a proximate device that is different from the mobile device; and transmitting the received identifier associated with mobile device and an indication of the determined status of the mobile device to the proximate device, the proximate device using the transmitted information to make a communication service routing decision with respect to a call or electronic message to the mobile device.

14. The method of claim 13, wherein the determined status indicates that the mobile device is being charged.

15. The method of claim 13, wherein the determined status indicates that the mobile device is being used for communication.

16. The method of claim 13, wherein the status of the mobile device is determined by:

transmitting a status query to the mobile device via the first communication channel; and receiving a status message from the mobile device via the first communication channel that reflects the status of the mobile device.

17. The method of claim 13, wherein the first communication channel is established via a protocol selected from a set comprising Bluetooth, WiFi, Zigbee, ultra-wideband and infrared.

18. The method of claim 13, wherein the second communication channel is established via a protocol selected from a set comprising Bluetooth, WiFi, Zigbee, ultra-wideband and infrared.

19. The method of claim 13, wherein the received identifier is an International Mobile Equipment Identity number.

20. The method of claim 13, wherein the received identifier is an International Mobile Subscriber Identity number.

21. The method of claim 13, wherein the mobile device is a mobile phone.

22. The method of claim 13, wherein the mobile device is a media player.

* * * * *